(No Model.)
J. G. DAVIS.
CORN AND COTTON PLANTER COMBINED.
No. 352,303. Patented Nov. 9, 1886.
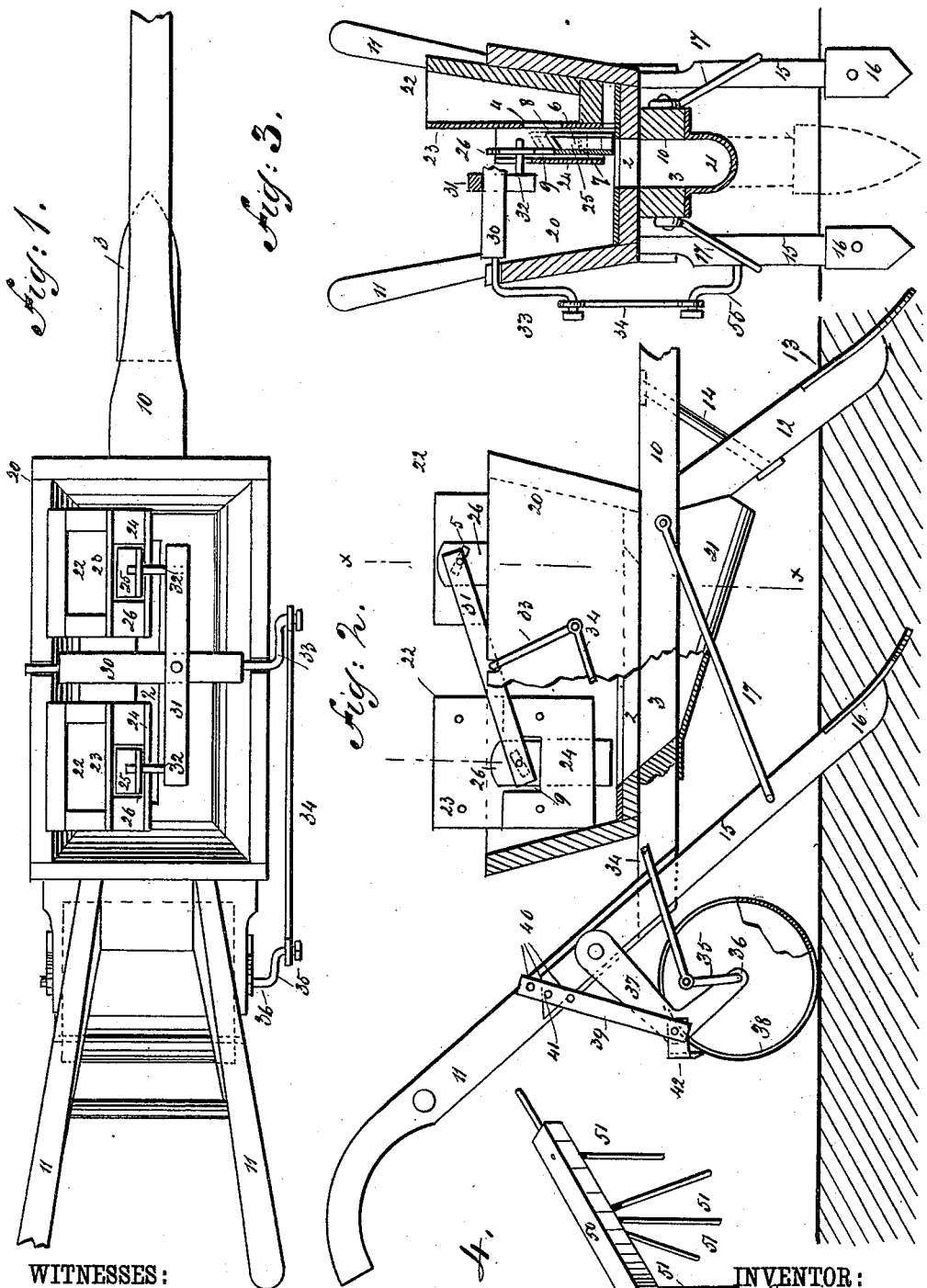
WITNESSES:
INVENTOR:
J. G. Davis
BY Munn & Co.
ATTORNEYS.

United States Patent Office.

JOSEPH G. DAVIS, OF HUNTSVILLE, TEXAS.

CORN AND COTTON PLANTER COMBINED.

SPECIFICATION forming part of Letters Patent No. 352,303, dated November 9, 1886.

Application filed August 7, 1886. Serial No. 210,303. (No model.)

*To all whom it may concern:*

Be it known that I, JOSEPH GREEN DAVIS, of Huntsville, in the county of Walker and State of Texas, have invented a new and Improved Combined Corn and Cotton Planter, of which the following is a full, clear, and exact description.

The object of my invention is to provide a planter which may be used as a cotton-planter or other small-seed planter, the various parts being so arranged that the number of grains planted in a hill may be regulated as desired, while the depth of the furrow may also be regulated in accordance with the requirements of the case.

Reference is to be had to the accompanying drawings, forming a part of this specification, in which similar figures of reference indicate corresponding parts in all the views.

Figure 1 is a plan view of my improved combination-planter. Fig. 2 is a side view of the same, parts being broken away and others shown in section to disclose the construction. Fig. 3 is a cross-sectional view of the planter, taken on the line $x$ $x$ of Fig. 2; and Fig. 4 is a perspective view illustrating the construction of the feeder employed when the planter is used for the purpose of planting cotton.

In constructing such an implement as the one illustrated in the drawings above referred to, I provide a beam, 10, having handles 11, that are secured thereto in the ordinary manner. The beam 10 carries a standard, 12, to which there is secured a furrow-opener, 13, the standard being preferably braced by a brace rod or bolt, 14, as illustrated. To each of the handles 11 there is connected a standard, 15, carrying a furrow-coverer, 16, the standards 15 being braced by rods 17, that extend forward and are connected to the beam 10.

To the upper face of the beam 10 there is secured a large hopper, 20, and in the bottom of this hopper there is formed a slot, 2, which registers with a slot, 3, formed in the beam, a chute, 21, the forward end of which is opened, being secured to the under side of the beam, as best shown in Figs. 2 and 3. To one side of the main hopper 20, I secure auxiliary hoppers, 22, two of said hoppers being preferably employed.

The inner faces of the hoppers 22 are formed in two distinct vertical planes, so that each face is in two sections, the lower outer section consisting of a plate, 24, while the upper section consists of a plate, 23, in the lower portion of which there is formed a slot or opening, 4. Between the two plates 23 and 24 of each hopper I arrange a feeder, 25, which consists of the plate 26, formed with a diagonal slot, 5, near its upper end, and of the block 6, secured to the plate 26 by screws 7, the arrangement being such that the block may be secured to the plate at any desired elevation, so as to regulate the quantity of seed delivered from the hopper 22. The block 6 is preferably faced with a metal strip, 8, and the upper edge of the block, or of the strip 8, if such strip is employed, slopes toward the plate 26, so that any seed which may fall through the opening 4 onto the block 6, or onto the strip 8 carried thereby, will, when the feeder is moved upward, fall out over the plate 24 into the chute 21 through the opening 9, that is formed in the plate 26. A transverse rock-shaft, 30, which carries a beam, 31, is mounted in proper bearings that are carried by the hopper 20, the beam 31 being provided with pins 32, which enter the diagonal slots 5 of the plates 26. Upon one end of the shaft 30 there is a crank-arm, 33, which is connected, through the medium of a connecting-rod, 34, with a crank-arm, 35, formed upon one end of the main shaft 36, said shaft being mounted between the brackets 37, that are pivotally connected to the standards 15. The shaft 36 carries a broad-faced wheel, 38, which serves not only as a support for the planter, but also acts to drive the crank-shaft.

As before stated, the planter is so constructed that the depth of the furrow may be regulated to meet the requirements of the particular kind of seed that is to be planted, and this adjustment is secured by means of the adjusting arms or irons 39, that are connected to the brackets 37, said irons being formed with a number of apertures, 40, through one of which a bolt, 41, is passed, in order to connect the irons with the handles 11.

From the construction described, it will be seen that as the planter is drawn forward the wheel 38 will be revolved, and in revolving will turn its shaft 36, which movement of the shaft 36 will impart a rocking movement to the rock-shaft 30, and this rocking movement of the shaft 30 will cause the feeders 25 to reciprocate, and as each feeder moves upward the supply of seed which has fallen upon its upper inclined face will fall through the opening 9 and into the chute 21, to be delivered to the furrow, which is opened in advance of the chute, the furrow being covered by the furrow-coverers 16 as the planter advances.

When the planter is to be used for the purpose of planting cotton, the seed-hoppers 22 and the rock-shaft 30 are removed, and the cotton-seed is placed in the main hopper 20, and delivered to the chute 21 by the action of a feeder, 50—such as the one illustrated in detail in Fig. 4, wherein there is shown a shaft provided with a crank-arm similar to the crank-arm 33, a number of agitating-fingers, 51, being secured to the under side of the shaft.

In connection with the wheel 38, I arrange a cleaner or scraper, 42, which serves to remove any loam or earth that may be taken up by the wheel.

Having thus described my invention, what I claim as new, and desire to secure by Letters Patent, is—

1. The combination, with the main hopper, of auxiliary hoppers provided with feeders 25, a rock-shaft, 30, carrying a beam, 31, pins 32, carried by the beam 31 and arranged to engage with the feeders 25, and a mechanism, substantially as described, whereby the feeders are reciprocated, as and for the purpose stated.

2. The combination, with hoppers 22, of feeders 25, consisting, essentially, of plates 26 and blocks 6, adjustably connected to the plates, a rock-shaft, 30, a beam, 31, carrying pins 32, that engage with diagonal apertures formed in the plates 26, a driving and supporting wheel, 38, the shaft of which is provided with a crank-arm, 35, and a connecting-rod, 34, extending from the crank-arm 35 to a crank arm, 33, formed upon the rock-shaft 30, substantially as shown and described.

3. In a combined corn and cotton planter, the combination, with a beam and its handle, of a furrow-opener and furrow-closers, an adjustable supporting and driving wheel, the shaft of which is provided with a crank-arm, 35, a connecting-rod, 34, a rock-shaft, 30, formed with an arm, 33, a beam, 31, carried by the rock-shaft, feeders 25, and auxiliary hoppers 22, substantially as described.

JOSEPH G. DAVIS.

Witnesses:
G. A. WYNNE,
H. Y. ROBINSON.